(12) United States Patent
Brown et al.

(10) Patent No.: US 10,591,263 B2
(45) Date of Patent: Mar. 17, 2020

(54) HIGH SPIN PROJECTILE APPARATUS COMPRISING COMPONENTS MADE BY ADDITIVE MANUFACTURE

(71) Applicant: James F. Brown, Clifton, VA (US)

(72) Inventors: James F. Brown, Clifton, VA (US); Thomas Ott, Hatton, ND (US)

( * ) Notice: Subject to any disclaimer, the term of this patent is extended or adjusted under 35 U.S.C. 154(b) by 0 days.

(21) Appl. No.: 15/852,968

(22) Filed: Dec. 22, 2017

(65) Prior Publication Data

US 2018/0154446 A1 Jun. 7, 2018

Related U.S. Application Data

(63) Continuation-in-part of application No. 15/078,077, filed on Mar. 23, 2016, now Pat. No. 9,851,186.
(Continued)

(51) Int. Cl.
*F42B 10/28* (2006.01)
*F42B 10/02* (2006.01)
(Continued)

(52) U.S. Cl.
CPC ............ *F42B 10/28* (2013.01); *B22F 3/1007* (2013.01); *B22F 3/1055* (2013.01); *B22F 5/009* (2013.01);
(Continued)

(58) Field of Classification Search
CPC ........ B22F 5/10; B22F 3/1007; B22F 3/1055; B22F 2301/052; B22F 2301/15;
(Continued)

(56) References Cited

U.S. PATENT DOCUMENTS

| 1,380,172 A | 5/1921 | Abbot | |
|---|---|---|---|
| 1,442,080 A * | 1/1923 | Lyburis | F42B 10/025 244/3.23 |

(Continued)

FOREIGN PATENT DOCUMENTS

| GB | 121174 A * | 12/1918 | ............ F42B 10/025 |
|---|---|---|---|
| WO | WO-2009056081 A1 * | 5/2009 | .............. F42B 5/067 |

OTHER PUBLICATIONS

"Check Out These 9mm 3D Printed Bullets Actually Tested Out", http://www.wideopenspaces.com/check-out-these-9mm-3d-printed-bullets-actually-tested-out (Year: 2016).*
(Continued)

*Primary Examiner* — Joshua T Semick
(74) *Attorney, Agent, or Firm* — Kilyk & Bowersox, P.L.L.C.

(57) ABSTRACT

A method of making a projectile apparatus is provided that includes making one or components of the apparatus using an additive manufacture technique such as 3-D printing or laser-aided additive manufacture. The projectile apparatus can have a projectile, a propellant, and one or more optional components such as a wading, a sabot, and an intermediary device. The projectile can be fired through a barrel having a smooth bore. Additive manufacture methods can be used that involve forming components from superalloys having nanoparticles incorporated therein. The projectile apparatus can convert gas pressure or gas velocity into a high rate of projectile spin. The projectile has long-range accuracy due to a high or sustainable velocity and high rate of spin.

19 Claims, 8 Drawing Sheets

Related U.S. Application Data

(60) Provisional application No. 62/136,862, filed on Mar. 23, 2015.

(51) Int. Cl.

| | | |
|---|---|---|
| *B33Y 80/00* | (2015.01) | |
| *B22F 5/10* | (2006.01) | |
| *B22F 3/105* | (2006.01) | |
| *B22F 3/10* | (2006.01) | |
| *F42B 14/06* | (2006.01) | |
| *F42B 10/26* | (2006.01) | |
| *B33Y 10/00* | (2015.01) | |
| *F42B 33/00* | (2006.01) | |
| *F42B 10/22* | (2006.01) | |
| *B22F 5/00* | (2006.01) | |
| *F42B 30/02* | (2006.01) | |
| *F42B 10/24* | (2006.01) | |
| *F42B 10/30* | (2006.01) | |
| *F42B 15/00* | (2006.01) | |
| *F42B 12/74* | (2006.01) | |
| *B22F 5/04* | (2006.01) | |
| *C22C 32/00* | (2006.01) | |
| *B33Y 70/00* | (2020.01) | |
| *B22F 1/00* | (2006.01) | |

(52) U.S. Cl.
CPC .................. *B22F 5/04* (2013.01); *B22F 5/10* (2013.01); *B33Y 10/00* (2014.12); *B33Y 80/00* (2014.12); *C22C 32/0026* (2013.01); *C22C 32/0036* (2013.01); *C22C 32/0073* (2013.01); *F42B 10/025* (2013.01); *F42B 10/22* (2013.01); *F42B 10/24* (2013.01); *F42B 10/26* (2013.01); *F42B 10/30* (2013.01); *F42B 12/74* (2013.01); *F42B 14/064* (2013.01); *F42B 14/068* (2013.01); *F42B 15/00* (2013.01); *F42B 30/02* (2013.01); *F42B 33/00* (2013.01); *B22F 1/0018* (2013.01); *B22F 2301/052* (2013.01); *B22F 2301/15* (2013.01); *B22F 2301/205* (2013.01); *B22F 2304/05* (2013.01); *B33Y 70/00* (2014.12)

(58) Field of Classification Search
CPC ........... B22F 2301/205; B22F 2304/05; B33Y 70/00; B33Y 10/00; B33Y 80/00; F42B 10/025; F42B 10/26; F42B 10/28
See application file for complete search history.

(56) References Cited

U.S. PATENT DOCUMENTS

| | | |
|---|---|---|
| 3,058,423 A | 10/1962 | Laager |
| 3,247,795 A | 4/1966 | Abela |
| 3,655,836 A | 4/1972 | Dehm et al. |
| 3,726,231 A | 4/1973 | Kelly et al. |
| 3,800,706 A * | 4/1974 | Gawlick ................ F42B 10/54 102/529 |
| 4,249,465 A | 2/1981 | Ballmann |
| 4,314,510 A | 2/1982 | Jeter et al. |
| 4,886,223 A | 12/1989 | Gartner |
| 5,214,238 A | 5/1993 | Young |
| 5,297,492 A | 3/1994 | Buc |
| 5,328,130 A | 7/1994 | Gilman et al. |
| 5,415,102 A | 5/1995 | White et al. |
| 6,085,660 A | 7/2000 | Campoli et al. |
| 6,453,820 B1 | 9/2002 | Anderson |
| 7,150,234 B2 | 12/2006 | Gilman et al. |
| 7,222,573 B2 | 5/2007 | Pontieri |
| 8,844,443 B2 | 9/2014 | Tomov |
| 9,851,186 B2 | 12/2017 | Brown |
| 10,023,505 B2 * | 7/2018 | Danforth ............. C06B 21/0075 |
| 2002/0134273 A1* | 9/2002 | Mihaylov ............... F42B 10/24 102/439 |
| 2014/0295087 A1* | 10/2014 | Rickenbacher ....... B22F 3/1055 427/383.1 |
| 2017/0322001 A1* | 11/2017 | Panousakis ............... F42B 5/02 |
| 2018/0073842 A1* | 3/2018 | Danforth ................ B33Y 80/00 |

OTHER PUBLICATIONS

Taofledermaus, ""Terrifying" 3D Printed Bullets—Shooting Trials", https://www.youtube.com/watch?v=PVyLGQUmXcg (Year: 2013).*

A*STAR, "Nanoparticles improve the strength of metallic alloys", https://phys.org/news/2017-06-nanoparticles-strength-metallic-alloys.html, Jun. 28 (Year: 2017).*

Agency for Science, Technology and Research (A*STAR), Singapore, "Nanoparticles improve the strength of metallic alloys," Phys Org, Jun. 28, 2017. (Year: 2017).*

Spencer, Jr., "Hypersonic Aerodynamic Characteristics of Minimum Wave Drag Bodies Having Variations in Cross-Sectional Shape," National Aeronautics and Space Administration, NASA Technical Note NASA TN D-4079, Washington, DC, Sep. 1967.

Crowell Sr., "The Descriptive Geometry of Nose Cones" (1996).

Santos, "Leading-Edge Bluntness Effects on Aerodynamic Heating and Drag of Power Law Body in Low-Density Hypersonic Flow," J. of the Braz. Soc. of Mech. Sci. & Eng., vol. XXVII, No. 3 (pp. 236-242) (Jul.-Sep. 2005).

HRL Laboratories, "Engineers 3-D print high-strength aluminum, solve ages-old welding problem using nanoparticles," Nature, Sep. 20, 2017.

Agency for Science, Technology and Research (A*STAR), Singapore, "Nanoparticles improve the strength of metallic alloys," Phys Org, Jun. 28, 2017.

* cited by examiner

HIGH SPIN PROJECTILE APPARATUS COMPRISING COMPONENTS MADE BY ADDITIVE MANUFACTURE

CROSS-REFERENCE TO RELATED APPLICATION

This application is a continuation-in-part application of U.S. patent application Ser. No. 15/078,077, filed Mar. 23, 2016, now U.S. Pat. No. 9,851,186 B2, issued Dec. 26, 2017, which in-turn claims priority to U.S. Provisional Patent Application No. 62/136,862, filed Mar. 23, 2015, both of which are incorporated herein in their entities by reference.

FIELD OF THE INVENTION

The present invention relates to accurate, extended-range firearms ammunition for use with smooth bore pistols, rifles, shotguns, muzzle loading guns, and the like, and methods of making such ammunition.

BACKGROUND OF THE INVENTION

Whether of small or large caliber, the rifled barrel has dominated projectile weapons as a means of introducing flight-stabilizing spin to the projectile. Rifled barrel twist rates from 1:36 or less to 1:7 or more produce rotational rates of from 30,000 to 300,000 RPM or more, which is sufficient to stabilize projectiles with length to diameter ratios of up to 5:1 or more. At any caliber or ratio, such projectiles from un-rifled barrels readily tumble, which greatly reduces accuracy and range.

The use of single-projectile bullets or slugs with smoothbore shotguns has a long history of innovation to increase range and accuracy. U.S. Pat. No. 3,726,231 discloses a waisted slug known as the BRI slug or bullet. Such waisted slugs grew to prominence in the 1970's and 1980's. The hollowed aft portion of the Foster slug improves accuracy by placing more mass in the front of the projectile, therefore reducing to some degree the tumble of solid slugs. The Brenneke slug achieves a similar result by retaining connection with the lower density wadding during flight, thereby increasing range and accuracy in smooth bore guns.

The late 20th century saw increased interest in use of the shotgun slug, which was motivated in part by a combination of user preference and regulatory mandate, especially on relatively flat terrain and in densely populated areas. The availability of rifled shotgun barrels also increased; however, this enhanced slug performance came at much higher cost for the shotgun and at the expense of unsatisfactory bird and buck shot performance; bird or buck shot from a rifled barrel can produce a hollow ring pattern. In addition, any gun with a rifled barrel may not be legally classified as a shotgun in some districts; therefore, prohibiting their use for hunting.

Nevertheless, there have been ongoing development efforts in sabot-shuttled projectile technology intended for firing through rifled barrels. U.S. Pat. No. 5,214,238 discloses a sabot for chambering conventional or sub-caliber bullets in a rifled shotgun. Sub-caliber bullets from less than .22 caliber to greater than .50 caliber have been disclosed. U.S. Pat. No. 5,415,102 discloses a muzzle loading sabot-shuttled bullet. These sub-caliber rounds provide higher kinetic energy, range, and accuracy over full-sized slugs.

Sources of projectile inaccuracies include wind, the effect of gravity during long flight times, and variations in gun powder charge and drag. Drag causes bullet velocity to decrease, which increases the time of flight to a target and the subsequent effect of gravity and wind. Slugs and full-caliber projectiles are especially subject to drag because of their relatively large diameters.

The types of drag that act on transonic and hypersonic bullets are from aerodynamic shock waves, skin friction, and base vacuum at the back of the projectile. U.S. Pat. No. 5,297,492 discloses a sabot shuttled sub-caliber projectile having a fin stabilized sub-caliber projectile further comprising an internal blind core filled with a tracer or propellant composition in part to reduce base vacuum drag at the rear of the projectile. Fins increase drag, but this is offset by the smaller diameter projectile. Sub-caliber, sabot-shuttled bullets without fins but fired through rifled barrels demonstrate comparable extended range and accuracy.

Bullet or projectile shape has a predictable effect on range, and ideal shapes and dimensions cannot be used without either a sabot or rifled barrel or a sabot with a finned projectile, FIG. 1 shows a comparison of drag characteristics for various nose shapes in the transonic to low Mach regions. The rankings shown in FIG. 1 are: superior (1), good (2), fair (3), and inferior (4). As illustrated in the graph shown in FIG. 1, the aerodynamic Von Karman and ¾ Parabola shapes have the lowest drag at transonic and hypersonic velocities. See, Gary A. Crowell, Sr., *The Descriptive Geometry Of Nose Cones* (1996). The cone profile disclosed in U.S. Pat. No. 5,297,492 has poor performance at velocities between Mach 0.8 and Mach 2.2. Mach 1.0 in dry air at 68° F. is 1,125 feet per second, and shotgun slug muzzle velocities typically range between Mach 1.2 and 1.8.

In U.S. Pat. No. 6,085,660, Campoli et. al. disclose a cannon sabot that allows "flow of a portion of the gas through the sabot" partially transverse to the barrel axis to counter the rotation caused by the rifling for finned projectiles or causing a low speed rotation of up to 6,000 rotations per minute from a smooth bore. This reduced rate of rotation helps stabilize finned projectiles, but it is insufficient to stabilize non-finned projectiles.

Regardless of caliber, there is a need for full caliber and sub-caliber non-finned ammunition that can spin-stabilize projectiles when fired through a smooth bore.

Commonly called 3D printing and professionally known as additive manufacture (AM), these terms relate to various processes for creating three-dimensional objects. AM has become the superordinate for desktop manufacturing, rapid manufacturing, on-demand manufacturing, microcasting, stereolithography, and agile tooling. Objects are formed using AM by either joining or solidifying materials, for example, by fusing powders or curing reactive liquids, respectively. Almost any shaped object can be formed by these processes, and the range of materials is growing rapidly.

A need exists for a method to efficiently manufacture high-quality components for projectile apparatus.

SUMMARY OF THE INVENTION

The present invention provides a projectile apparatus comprising a projectile, a propellant, and optionally a wadding, a sabot, or both. The projectile apparatus can optionally comprise a primer, an ignitor, or other primer or ignition means, devices, and materials. The projectile apparatus can provide a projectile rate of spin of 30,000 RPM or greater and can be fired with accuracy and extended range through a smooth bore barrel. The projectile apparatus one or more elements or features for converting a portion of the gas pressure (potential energy) generated by combustion of the propellant into a high rate of projectile spin (kinetic energy) as the projectile moves through a smooth, un-rifled barrel. The energy required to achieve this degree of rotation is less than or comparable to the energy ordinarily used to overcome the friction and deformation caused by forcing a bullet through a rifled barrel. The projectile apparatus can further comprise one or more intermediary components, elements or features for providing communication between one or more of the bullet, the sabot, and the wadding, or for directing the flow of combustion gases. In some embodiments, the bullet or projectile further comprises a device or means for providing thrust and/or for reducing back drag after exiting the barrel.

The present invention also provides a method for making a projectile apparatus wherein one or more components of the projectile apparatus are made by additive manufacture, for example, by 3D printing or by laser-aided additive manufacture. The one or more components of the projectile apparatus can be made by laser-aided additive manufacture. The method can use a superalloy material having nanoparticles incorporated therein, as a starting material. Exemplary superalloy materials having nanoparticles incorporated therein include: a nickel-based superalloy, such as INCONEL 625, having titanium diboride nanoparticles incorporated therein; or an aluminum-based superalloy, such as A17075 or A16061, having zirconium-based nanoparticles incorporated therein.

The present invention also provides for the manufacture of one or more projectile apparatus components by using 3D printing or additive manufacturing, for example, projectiles, projectiles comprising a primer, ignitor or other primer or ignition means, projectiles comprising combustible materials, and the like. 3D printing can be used to manufacture propellants and primers, for example, those comprising nitrocellulose and a binder, or those comprising heat, pressure-sensitive, or electrically detonated materials, such as magnesium, mercury fulminate, tannerite, or black powder. Methods of manufacture are provided that comprise additive manufacture under inert conditions or under a vacuum, for example, to form combustible propellants, projectiles, and the like, at elevated temperatures. The methods can involve additive manufacture techniques including 3D printing, metal deposition with melting, laser-aided additive manufacture, and the like.

BRIEF DESCRIPTION OF THE DRAWINGS

The present invention can be even better understood with reference to the appended drawings that are intended to illustrate, not limit, the present invention.

DETAILED DESCRIPTION OF THE INVENTION

Figure 1:
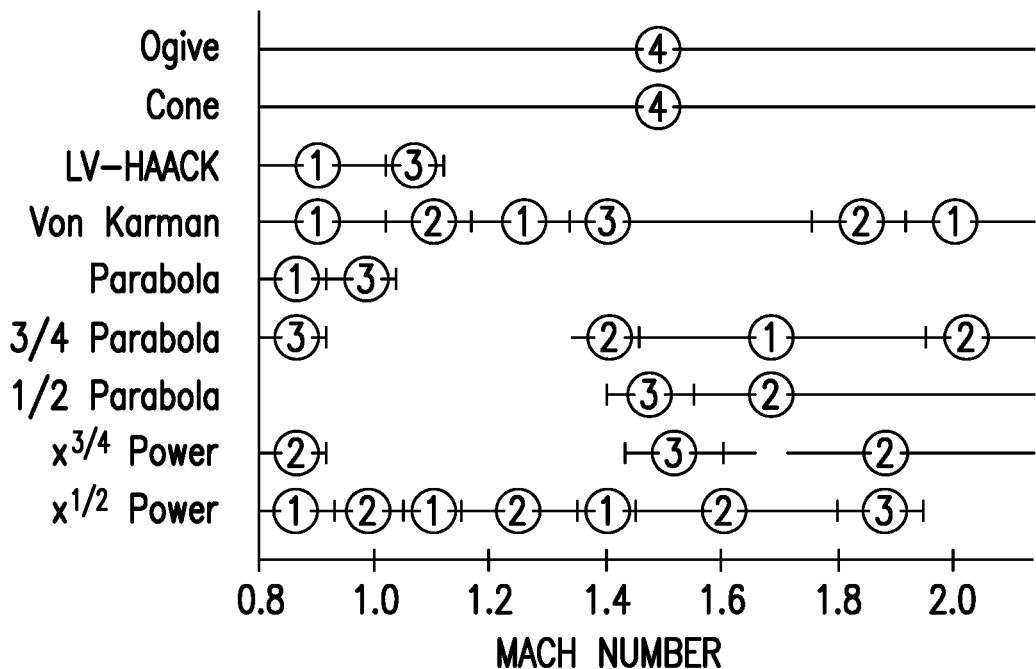
FIG. 1 is a graph showing a comparison of drag characteristics for various nose shapes in the transonic to low Mach regions. The rankings shown in FIG. 1, used to characterize the shapes, are: superior (1), good (2), fair (3), and inferior (4).

In one or more embodiments of the present invention, an element or feature of the projectile apparatus, configured to convert blast pressure from burring propellant to effect projectile spin, comprises one or more turbine structures. If more than one turbine structure is provided, the turbine structures can each be the same as or different from at least one other. These structures can be implemented as part of the projectile, part of a sabot, part of a wadding, part of an intermediary component, the entirely of any such component, or a combination thereof. For example, the projectile apparatus can have a wadding that comprises fins, vents, or channels that direct a flow of combustion gases into communication with turbine elements integral with a sabot, causing the sabot and a captured projectile it contains to spin at a high rate, while the wadding, acting as a turbine stator, does not spin substantially relative to the barrel. A system including the projectile apparatus, a projectile, and a smooth bore barrel, is also provided, as is a method of using the system.

According to various embodiments of the present invention, a sabot is provided that comprises fins, vents, or channels that direct a flow of combustion gases into communication with turbine elements that are part of the projectile, wherein the sabot is substantially not in rotation relative to the barrel while the projectile spins inside the sabot. In yet other embodiments of the present invention, a wadding is included that can regulate, direct, control, or a combination thereof, the flow of combustion gases into turbine elements of the projectile, causing the projectile to spin at a high rate of speed while the wadding is substantially prevented from rotation relative to the barrel. The wadding can be prevented from spinning, for example, due to friction. In still other embodiments of the present invention, one or more intermediary elements or components are included that can regulate, direct, control, or a combination thereof, the flow of combustion gases into turbine elements of the projectile, causing the projectile to spin at a high rate of speed while the wadding is substantially prevented from rotation relative to the barrel. The intermediary elements or components can be prevented from spinning, for example, due to friction. In other embodiments, the intermediary components may mechanically link two or more of the projectile, the sabot or the wadding. A system comprising such a sabot, a projectile, and a smooth bore barrel, as well as a method using the system, are also provided.

In each of the various embodiments described above, the projectile, sabot, intermediary components, or wadding can have features that reduce friction against the barrel. It is to be understood that such embodiments do not preclude either the projectile, the sabot, the intermediary components, or a combination thereof, from being acted-upon directly by combustion gases, without regulation, control, or direction from another device.

According to various embodiments of the present invention, a projectile apparatus is provided that comprises a propellant and a projectile. The projectile apparatus is configured to spin when fired from a smooth bore barrel. The propellant can comprise a combustible material that produces exhaust gases when burned. The projectile apparatus is configured to direct the exhaust gases from the burning propellant away from the projectile as the propellant is burned. The projectile can comprise one or more elements or features for converting gas pressure or velocity from the propellant, as the propellant is burned, to a high rate of projectile spin within the smooth bore barrel. The high rate of projectile spin can be greater than 30,000 rotations per minute upon exiting the barrel, for example, greater than 50,000 rotations per minute, greater than 70,000 rotations per minute, or greater than 100,000 rotations per minute. In some cases, the high rate of projectile spin upon exiting the barrel is greater than 200,000 rotations per minute. The one or more elements or features can comprise a turbine element, and the turbine element can be one of an impulse turbine element, a reactive turbine element, a centripetal turbine element, a Tesla turbine element, or a combination thereof. The one or more elements or features can be configured to regulate, control, and direct gases produced by the propellant as the propellant is burned, into the turbine element. The one or more elements or features can comprise vanes, blades, channels, nozzles, a stator, or a combination thereof. If a turbine element is provided as part of the projectile or an intermediary component in communication with the projectile, the turbine element can be configured to cause the projectile to spin upon burning the propellant. The projectile can have an aerodynamic profile, for example, conforming to a Von Karmen profile, a ¾ parabola profile, or an x¾ power profile.

The projectile can comprise, but is not limited to, a material having a density of from about 8 grams per cubic centimeter to about 19 grams per cubic centimeter. The projectile can comprise one or more of copper, lead, tantalum, uranium, and tungsten. The projectile can comprise magnetic components, rare earth magnetic components, ceramic magnetic components, or combinations thereof. The projectile can comprise materials having a density of less than 8 grams per cubic centimeter. The projectile can, for example, comprise the alkali and alkali earth metals, lithium, sodium, potassium, beryllium, or magnesium. The projectile can comprise a combustible material, stainless steel, zinc, a superalloy, a wax, or the like.

Any of the components of the projectile apparatus can comprise, but not be limited to, copper, lead, tantalum, uranium, tungsten, magnetic components, rare earth magnetic components, ceramic magnetic components, combinations of magnetic components, a material having a density of less than 8 grams per cubic centimeter, an alkali metal, an alkali earth metal, lithium, sodium, potassium, beryllium, magnesium, a combustible material, stainless steel, zinc, a superalloy, a wax, a combination thereof, and the like.

Features of the projectile may change in a dimension or shape through combustion of materials comprising the projectile. The projectile can have a caliber of .22, .30, .38, .44, .45, or .50. The projectile can comprise one or more channels or ducts beginning at, or near, the rear of the projectile and extending to, or near, the front of the projectile. The one or more channels or ducts can be configured to convey exhaust gas from the propellant as the propellant is burned, to one or more rotational nozzles or jets configured to direct exhaust to a smooth bore barrel ahead of the projectile. The propellant may be formed to have a shape controlling the location of ignition and rate of burning.

According to various embodiments of the present invention, a method is provided that comprises placing the projectile in a smooth bore barrel and igniting the propellant to cause the propellant to burn and form exhaust gases. According to the method, the one or more elements or features can direct the exhaust gases such that the exhaust gases cause the projectile to spin in the smooth bore barrel. The exhaust gases can cause the projectile to exit the smooth bore barrel at a rate of projectile spin that is greater than 30,000 rotations per minute, for example, greater than 100,000 rotations per minute or greater than 200,000 rotations per minute. The projectile apparatus can exit the smooth bore barrel at a muzzle velocity of from about Mach 1.0 to about Mach 3.0 or more.

According to various embodiments of the present invention, a projectile apparatus is provided that comprises a propellant, a projectile, and a sabot, wherein the projectile apparatus is configured to spin when fired from a smooth bore barrel. The propellant can comprise a combustible material that produces exhaust gases when burned, and the projectile apparatus can be configured to direct the exhaust gases from the propellant away from the propellant as the propellant is burned. One or both of the projectile and the sabot can comprise one or more elements or features for converting gas pressure or velocity from the propellant, as the propellant is burned, to a high rate of projectile spin within the smooth bore barrel. The high rate of projectile spin can be greater than 30,000 rotations per minute upon exiting the barrel, for example, greater than 50,000 rotations per minute, greater than 70,000 rotations per minute, or greater than 100,000 rotations per minute. In some cases, the high rate of projectile spin upon exiting the barrel is greater than 200,000 rotations per minute. The sabot can comprise a turbine element and the turbine element is one of an impulse turbine element, a reactive turbine element, a centripetal turbine element, a Tesla turbine element, or a combination thereof. The sabot can comprise one or more elements or features configured to regulate, control, and direct gases produced by the propellant as the propellant is burned, into the turbine element. The one or more elements or features can comprise vanes, blades, channels, nozzles, a stator, or a combination thereof.

The projectile apparatus can comprise one or more bearings, races, sleeves, bushings, circuits, combinations thereof, and the like.

The projectile apparatus can comprise one or more channels or ducts that begin at, or near, the rear of the projectile apparatus and extend to, or near, the front of the projectile apparatus. The one or more channels or ducts can be configured to convey exhaust gas from the propellant as the propellant is burned, to one or more rotational nozzles or jets configured to direct exhaust gases to the smooth bore barrel ahead of the projectile apparatus. The projectile apparatus can further comprise an intermediary component, and the intermediary component can comprise one or more elements or features configured to regulate, control, and direct gases produced by the propellant, as the propellant is burned, into the turbine element. The projectile can comprise a device or means for reducing drag, adding thrust, or both. The device or means can comprise an air breathing or self-oxidizing element or feature. The sabot can be configured to have substantially greater friction against the smooth bore barrel and reduced propensity to rotate, compared to the projectile. According to various embodiments of the present invention, a method is provided that comprises placing the projectile apparatus in a smooth bore barrel and igniting the propellant to cause the propellant to burn and form exhaust gases. The one or more elements or features can be configured to direct the exhaust gases such that the exhaust gases cause the projectile to spin in the smooth bore barrel. The exhaust gases can cause the projectile to exit the smooth bore barrel at a rate of projectile spin that can be greater than 30,000 rotations per minute, for example, greater than 50,000 rotations per minute, greater than 70,000 rotations per minute, or greater than 100,000 rotations per minute. In some cases, the high rate of projectile spin upon exiting the barrel is greater than 200,000 rotations per minute. The projectile apparatus can be configured to cause the projectile to exit the smooth bore barrel at a muzzle velocity of from about Mach 1.0 to about Mach 3.0 or more.

According to yet other embodiments of the present invention, a projectile apparatus is provided that comprises a propellant, a projectile, and a wadding, wherein the projectile apparatus can be configured to spin when fired from a smooth bore barrel. The propellant can comprise a combustible material that produces exhaust gases when burned, and the projectile apparatus can be configured to direct the exhaust gases from the propellant away from the propellant as the propellant is burned. One or both of the projectile and the wadding CAN comprise one or more elements or features for converting gas pressure or velocity from the propellant, as the propellant is burned, to a high rate of projectile spin within the smooth bore barrel. The high rate of projectile spin can be greater than 30,000 rotations per minute upon exiting the barrel, for example, greater than 50,000 rotations per minute, greater than 70,000 rotations per minute, or greater than 100,000 rotations per minute. In some cases, the high rate of projectile spin upon exiting the barrel is greater than 200,000 rotations per minute. The projectile apparatus can be configured to cause the projectile to exit the smooth bore barrel at a muzzle velocity of from about Mach 1.0 to about Mach 3.0 or more. The wadding can comprise a turbine element, and the turbine element can be one of an impulse turbine element, a reactive turbine element, a centripetal turbine element, a Tesla turbine element, or a combination thereof. The wadding can comprise one or more elements or features that are configured to regulate, control, and direct gases produced by the propellant as the propellant is burned, into the turbine element. The one or more elements or features can comprise vanes, blades, channels, nozzles, a stator, or a combination thereof. The wadding can comprise one or more channels or ducts beginning at, or near, the rear of the projectile and extending to, or near, the front of the projectile. The one or more channels or ducts can be configured to convey exhaust gas from the propellant as the propellant is burned, to one or more rotational nozzles or jets that are configured to direct the exhaust gases to the smooth bore barrel ahead of the projectile. The projectile apparatus can further comprise an intermediary component and the intermediary component can comprise one or more elements or features configured to regulate, control, and direct gases produced by the propellant, as the propellant is burned, into the turbine element. The projectile can comprise a device or means for reducing drag, adding thrust, or both. The projectile can comprise an air breathing or self-oxidizing device or means. The projectile apparatus can further comprise a sabot and an intermediary component, and the intermediary component can be positioned between the wadding and the sabot. The intermediary component can comprise a mechanical coupling between the wadding and the sabot. The wadding can be configured to have substantially greater friction against the smooth bore barrel and reduced propensity to rotate, compared to the projectile. According to yet other embodiments of the present invention, a method is provided that comprises placing the projectile apparatus in a smooth bore barrel and igniting the propellant to cause the propellant to burn and form exhaust gases. The one or more elements or features can be configured to direct the exhaust gases such that the exhaust gases cause the projectile to spin in the smooth bore barrel. The exhaust gases can cause the projectile to exit the smooth bore barrel at a rate of projectile spin that is greater than 30,000 rotations per minute, for example, greater than 50,000 rotations per minute, greater than 70,000 rotations per minute, or greater than 100,000 rotations per minute. In some cases, the high rate of projectile spin upon exiting the barrel is greater than 200,000 rotations per minute. The projectile apparatus can be configured to cause the projectile to exit the smooth bore barrel at a muzzle velocity of from about Mach 1.0 to about Mach 3.0 or more.

According to yet other embodiments of the present invention, a method is provided for inducing a high rate of spin on a projectile in a barrel having a smooth bore. The method comprises causing a propellant to burn and produce combustion gases at pressures of about 10,000 PSI or more, in the form of potential energy. A turbine element is coupled to a projectile, and the turbine elements are configured to convert the potential energy of the combustion gases to kinetic rotational energy of the coupled turbine element and projectile. The method comprises using the turbine element to convert the potential energy into kinetic rotational energy of the coupled turbine element and projectile so as to cause the projectile to spin at a rate of 30,000 RPM or greater, for example, at a rate of greater than 50,000 rotations per minute, greater than 70,000 rotations per minute, or greater than 100,000 rotations per minute. In some cases, the high rate of projectile spin upon exiting the barrel is greater than 200,000 rotations per minute. The projectile apparatus can be configured such that the method causes the projectile to exit the smooth bore barrel at a muzzle velocity of from about Mach 1.0 to about Mach 3.0 or more. A wadding, sabot, or both, can further be coupled to the turbine element and projectile to regulate, control, and direct the flow of combustion gases into the turbine element, thereby increasing efficiency of the conversion from the potential energy to the kinetic rotational energy. Drag on the projectile after leaving the barrel can be reduced. The projectile velocity after leaving the barrel can be substantially maintained or increased. By using the turbine element to convert the potential energy to kinetic energy, the projectile can be caused to spin at a rate of 300,000 RPM or greater.

The turbine structure can operate generally by impulse, reaction, or a combination of the two. For impulse turbines, there is no need to generate a pressure change between the working fluid or combustion gas in the rotor or turbine elements (for example, the moving blades). No pressure casement is required around the rotor because the fluid jet is created by the nozzle prior to reaching the rotor or turbine elements. The pressure drop takes place in the stationary blades, nozzles, fins, guides, ducts, or stator. Before reaching the turbine, the pressure head of the fluid is changed to velocity head by accelerating the fluid by these elements and features.

Figure 2:
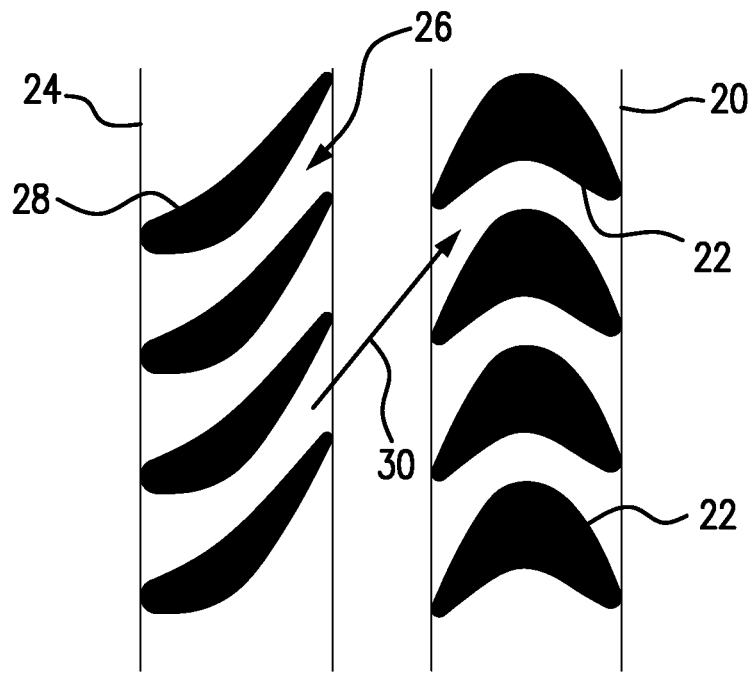
FIG. 2 is a schematic diagram showing the orientation of nozzles for directing combustion gases into impulse turbine rotor elements or blades, in a projectile apparatus according to various embodiments of the present invention.

FIG. 2 illustrates the structure of such an impulse nozzle-turbine or stator-turbine arrangement. As shown in FIG. 2, a rotor structure 20, also referred to as a turbine element structure, is provided with a plurality of turbine blades 22. A nozzle structure 24 comprises a plurality of nozzles 26 defined by a plurality of fins 28. Nozzles 26 are oriented such that they direct combustion gases into impulse turbine blades 22 of rotor structure 20. Directional arrow 30 shows the direction of combustion gases leaving nozzles 26 and directed toward turbine blades 22. According to such embodiment of the present invention, nozzle structure 24 can be a molded, machined, or otherwise formed structure of the wadding, the sabot, or some intermediary device. Rotor structure 20, on the other hand, can be a feature of either the sabot, if not used as the stator, or the projectile. In some cases, nozzle structure 24 can be a feature of the wadding, jetting combustion gases directly into turbine blades of the projectile.

Figure 3:
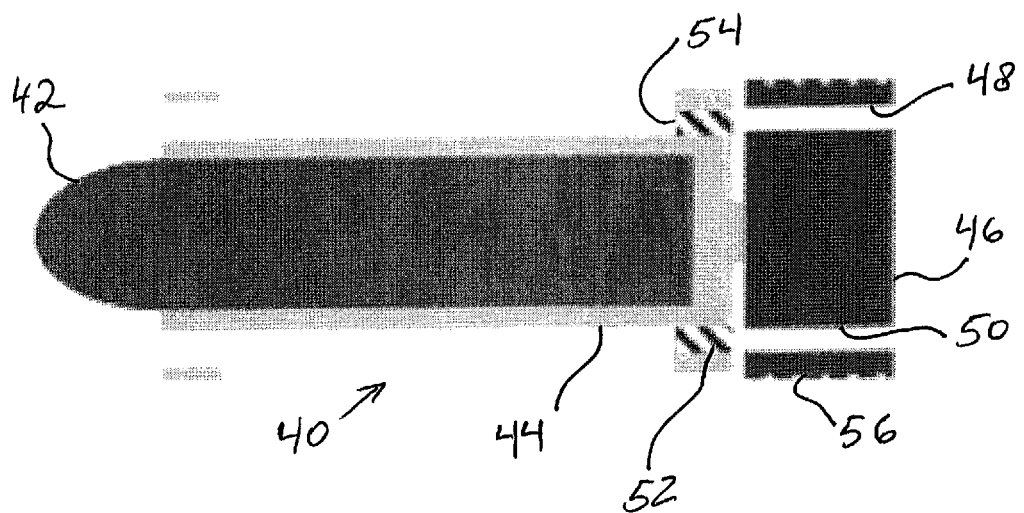
FIG. 3 is a side cross-sectional view of a projectile apparatus according to various embodiments of the present invention and showing fins, ducts, and nozzles formed in the wadding, which direct combustion gases at an angle into the blades of an impulse turbine.

In one or more embodiments of the present invention, as shown in FIG. 3, a projectile apparatus 40 is provided that comprises a projectile 42, a sabot 44, and a wadding 46. High pressure combustion gases from a burning propellant (not shown) enter channels 48 and 50 that pass-through wadding 46 and are directionally and symmetrically vented against blades 52 of an impulse turbine 54 that is integral to the rear end of sabot 44. FIG. 3 shows fins, ducts, or nozzles 56 formed in wadding 46, which direct combustion gases at an angle into blades 52 of impulse turbine 54. Friction against a smooth bore barrel prevents wadding 46 from spinning, while sabot 44 is able to spin more or less freely in the smooth bore barrel. Various compositions, elements, and other mean can be used to reduce friction between sabot 44 and the smooth bore barrel wall so that sabot 44 spins with minimal resistance. An element or feature can be used to reduce frictional spin coupling between wadding 46 and sabot 44. In some cases, although not shown in FIG. 3, wadding channels 48 and 50 can direct flow to an impulse turbine integral to the projectile. In yet other embodiments, an optional intermediary device, situated between the wadding and sabot or projectile, can comprise the impulse turbine. Gases exhausted ahead of the sabot or projectile can have little influence in retarding forward acceleration out of the barrel.

Figure 4:
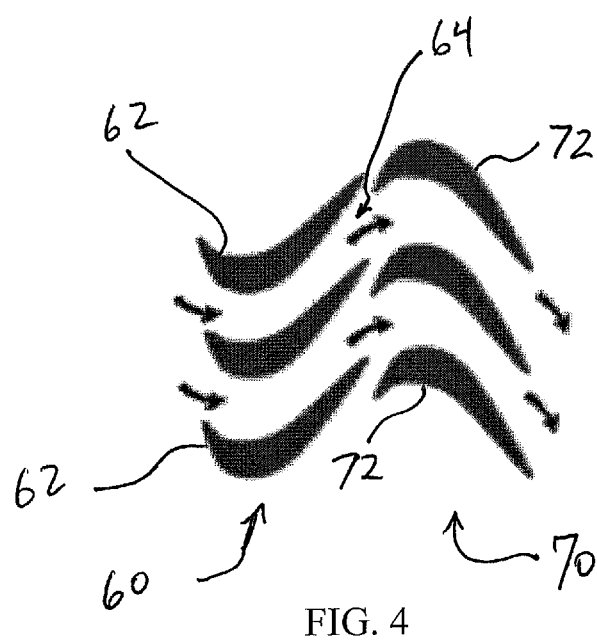
FIG. 4 is a schematic diagram showing how combustion gases can be directed by a stator into the blades of a reaction turbine in a projectile apparatus according to various embodiments of the present invention.

As shown in FIG. 4, high pressure combustion gases from burning propellant can be exhausted in the direction shown by the directional arrows, through a stator structure 60 and into a rotor structure 70. Stator structure 60 comprises of plurality of fins 62 that define a plurality of nozzles 64. High pressure combustion gases exiting nozzles 64 are directed against turbine blades 72 of rotor structure 70, causing rotor structure 70 to spin. Rotor structure 70 is part of a reaction turbine that develops torque by reacting to gas or fluid pressure or mass directed against the rotor or turbine blades. Combustion gases can be directed by stator structure 60 into blades 72 of rotor structure 70. The pressure of the gas or fluid changes as it passes through the turbine rotor blades. A pressure casement can be used to contain the working fluid because there is a change in pressure across the blades. Single stage reaction turbines can be used that are free of a stator, and working fluids can enter the rotor parallel to the axis of rotation.

In some embodiments of the present invention, the optional stator element is used, and is similar to the nozzle, vanes, or ducts of the impulse turbine structures described above. The stator element can be a formed feature of the wadding, sabot, or an intermediary device, and the rotor or turbine can be an integral formed feature of the sabot or projectile. The wadding or sabot, with stator functionality, is optional in reaction turbines according to various embodiments of the present invention. In some embodiments, a stator element can be present in a wadding, a sabot, or both.

Figure 5A:
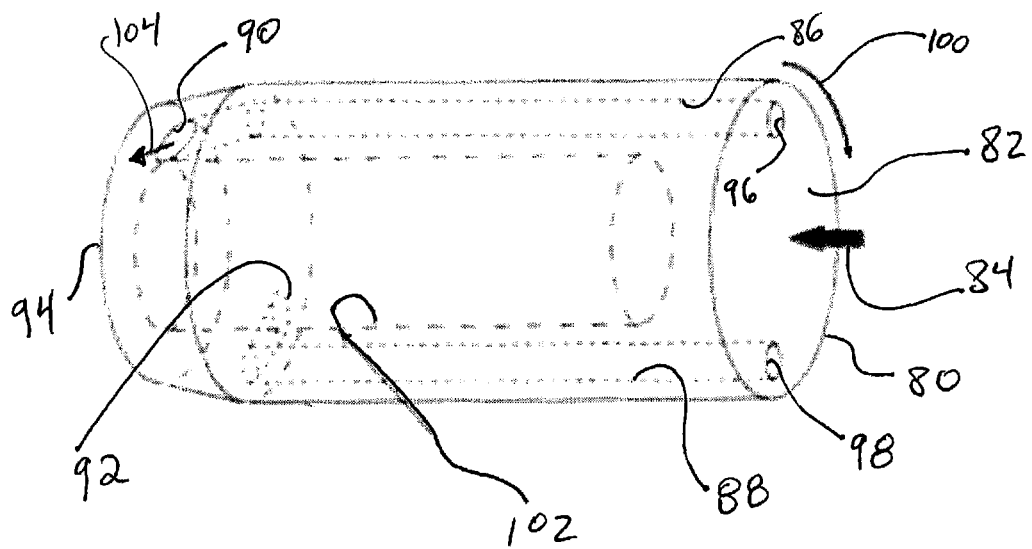
FIG. 5A is a side, back perspective view showing exhaust gas flow passageways and a projectile chamber in phantom, wherein the flow passageways enable high pressure combustion gases to be directed into channels in the sabot and vented at the front of the sabot transversely to the axis of the barrel, causing rotation of the sabot. A projectile is not shown in FIG. 5A
Figure 5B:
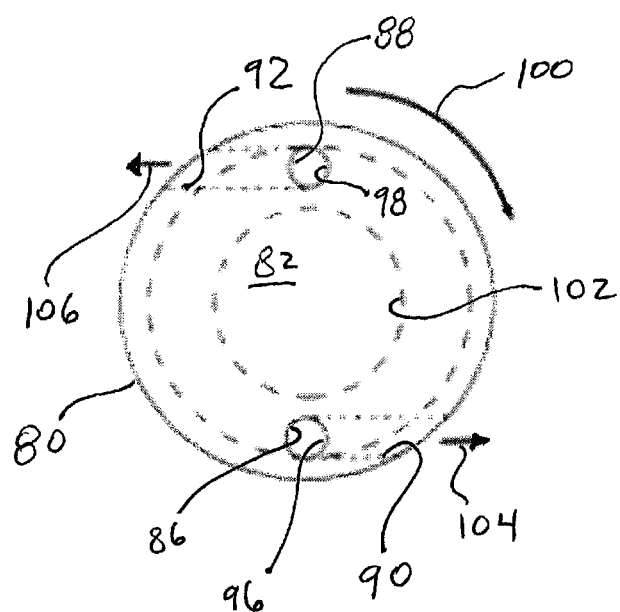
FIG. 5B is a back-end view of the sabot shown in FIG. 5A.

FIGS. 5A and 5B show a sabot 80 according to various embodiments of the present invention. In the embodiment of the present invention exemplified in FIGS. 5A and 5B, high pressure combustion gases act on a rear end 82 of sabot 80, in the direction shown by directional arrow 84. The gases are vented from the rear of sabot 80 through two symmetrically located vent tubes 86 and 88, shown in phantom, that intersect tangential jets 90 and 92, respectively, near a front end 94 of sabot 80. As shown in FIGS. 5A and 5B, high pressure combustion gases are directed into channels in the sabot and vented at the front of the sabot transversely to the axis of a smooth bore barrel, causing rotation of sabot 80 in the barrel. The rotation occurs in the direction depicted by directional arrow 100. The directions of thrust caused by combustion gases exiting tangential jets 90 and 92 are shown by directional arrows 104 and 106, respectively. Vent tubes 86 and 88 have entrance openings 96 and 98, respectively. Sabot 80 comprises a cavity 102, shown in phantom, for accommodating a projectile. A projectile is not shown in FIGS. 5A and 5B. While significant pressure losses of nearly 50% can accrue at the near right angle between vent tubes 86 and 88 and the respective tangential jets 90 and 92, the simplicity of the design is exemplary of a reaction turbine sabot according to various embodiments of the present invention.

The reaction turbine aspects described above can be applied to a bullet or projectile directly, without a stator. Examples include gas checks or other sealing features, lubricants and other friction reducing features, combinations of these features, and the like. For example, a wadding having combustion gas-controlling or gas-regulating features can be provided, an anti-spin coupling device between the projectile or sabot and the wadding can be provided, or the like.

Figure 6A:
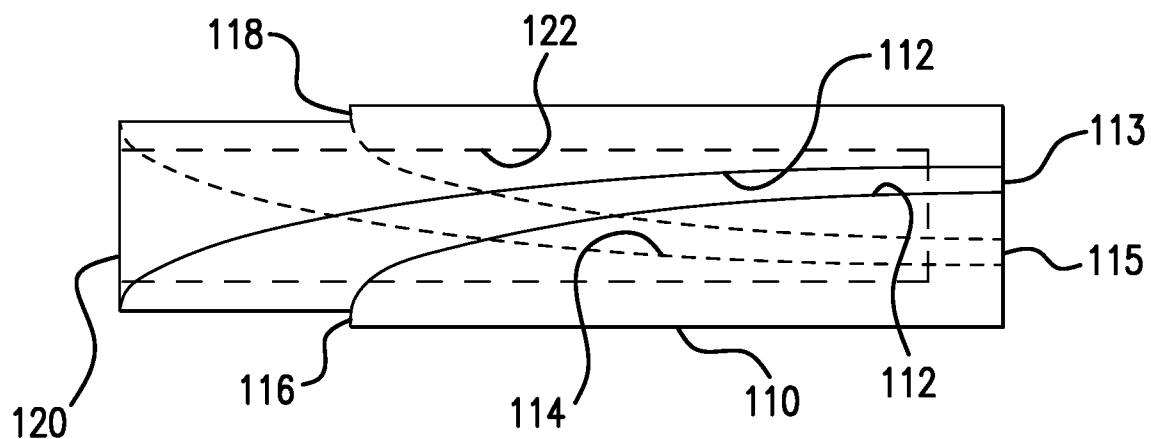
FIG. 6A is a side view in partial phantom showing channels in the wall of a sabot according to various embodiments of the present invention and which are aerodynamically turned transversely to the axis of the barrel, causing torque and rotation. A projectile is not shown in FIG. 6A.
Figure 6B:
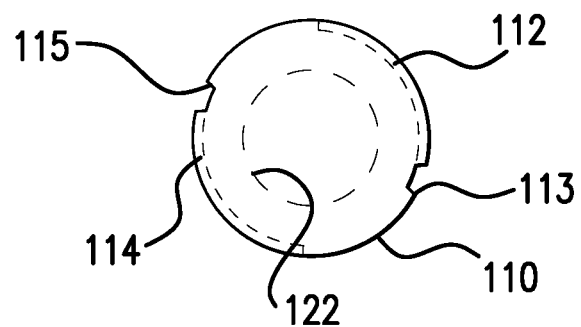
FIG. 6B is a back-end view of the sabot shown in FIG. 6A, in partial phantom.

In yet other embodiments of a reaction turbine projectile apparatus of the present invention, the projectile or a sabot holding a projectile can be configured as shown in FIGS. 6A and 6B. The embodiment exemplified in FIGS. 6A and 6B demonstrates how combustion gases can enter channels in the wall of a sabot and be aerodynamically turned transversely to the axis of a smooth bore barrel, causing torque and rotation. A projectile is not shown in FIGS. 6A and 6B. As shown, a sabot 110 comprises one or more expansion channels 112 and 114 that have respective blast inlets or entrance openings 113 and 115. Combustion gases can enter expansion channels 112 and 114 through respective entrance openings 113 and 115 at the rear end of sabot 110. The combustion gases can work against sabot 110 as the gases travel down the expansion channels, changing directions, exiting at respective exhaust jets 116 and 118 at a front end 120 of sabot 110, and causing rotation of sabot 110. Exhaust gases are vented from exhaust jets 116 and 118 down a smooth bore barrel ahead of the projectile and ahead of sabot 110. Sabot 110 has an interior cavity 122 for accommodating a projectile. While not shown, this example, as with others, can include gas checks or other sealing features, lubricants and other friction-reducing features, and combinations of these elements and features. In addition, or instead, a wadding can be provided that has combustion gas-controlling or gas-regulating features, an anti-spin coupling device can be provided between the projectile or sabot and the wadding, a combination thereof can be provided, or the like.

Figure 7:
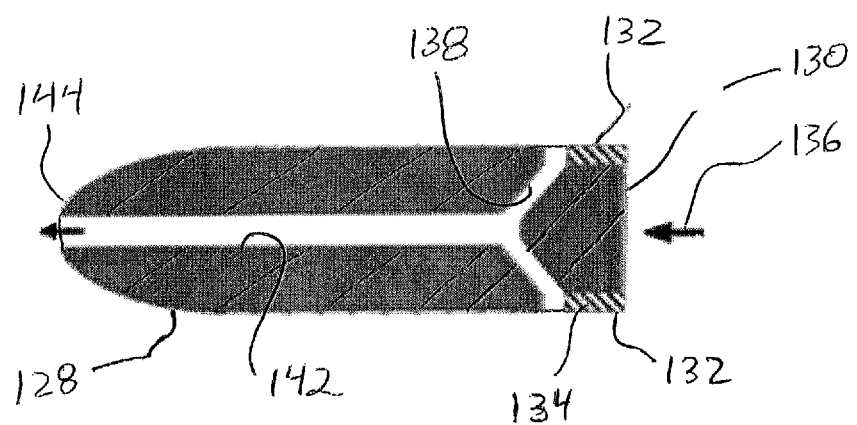
FIG. 7 is a cross-sectional side view of a projectile apparatus according to various embodiments of the present invention and showing how, without fins or vanes, a flow of gas can be directed to a turbine.

In some embodiments, a turbine element integral to the projectile can be configured as either an impulse or reaction turbine. FIG. 7 exemplifies a projectile apparatus according to various embodiments of the present invention that forms an undirected flow of combustion gases into an integral reaction turbine. The embodiment exemplified in FIG. 7 is free of fins or vanes to direct the flow of gas to the turbine. A projectile 128 can be placed adjacent a wadding 130, in a smooth bore barrel. Wadding 130 comprises a turbine structure 132 that comprises a plurality of turbine blades 134. Turbine blades 134 can be implemented as reaction blades. Combustion gas pressure can enter the turbine directly, in the direction shown by directional arrow 136. Momentum can be transferred to blades 134, and the exhaust gas can be directed at a rear end 138 of projectile 128, and exhausted through a center duct 142 toward a front end 144 of projectile 128. In some cases, wadding 130 can be configured to direct the gas flow at an angle into turbine structure 132 such that turbine can be implemented as an impulse turbine.

In yet other embodiments of the present invention, a rotation-producing element or feature is provided that converts blast pressure to rotation and can comprise a centrifugal or radial turbine. In such embodiments, there is a drop in static pressure and kinetic energy of the flowing gas, or working fluid, which is converted to torque on an impeller. The impeller element can be an element or feature of the projectile or sabot, and flow to the impeller can be guided by a wadding. Other suitable intermediary devices can be used to direct the flow of blast pressure to the impeller.

Figure 8:
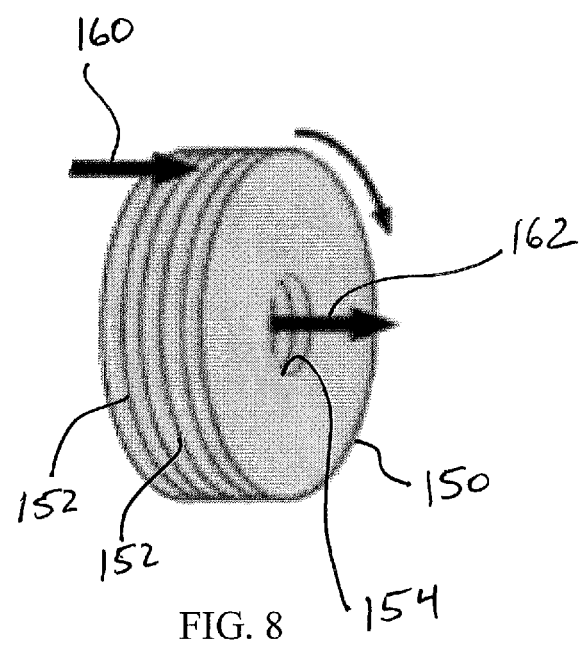
FIG. 8 is a perspective view of a wadding, sabot, or projectile feature that can be part of a projectile apparatus according to various embodiments of the present invention, and showing how high-pressure gas or fluid is directed tangentially toward the outer disks of a Tesla turbine structure, spirals inwardly, and exits from the center.

While many mechanical and electromechanical means and devices might be considered to induce high rates of projectile spin, and not all involve turbines, a Tesla turbine structure can be a preferred turbine feature for inducing spin. According to various embodiments of the present invention, the projectile apparatus comprises a Tesla turbine structure comprising a bladeless centripetal flow turbine, for example, as schematically exemplified in FIG. 8. As shown in FIG. 8, a Tesla turbine structure 150 is provided and comprises a plurality of disks 152. High pressure gas or fluid is directed tangentially in the direction shown by directional arrow 160, toward the outer surfaces of the disks of the Tesla turbine structure, spirals inwardly, and exits as low-pressure exhaust from a center 154 of the structure, in the direction shown by directional arrow 162. Such a structure can be referred to as a boundary layer turbine because it uses the boundary layer effect, and not a fluid impinging effect, on the turbine blades. Such embodiments of the present invention can combine aspects of both impulse and reaction mechanisms.

The turbine structure can comprise a plurality of smooth disks spaced apart from one another by a small distance, and can comprise a nozzle that applies a high pressure, high velocity, working fluid, tangentially to the edge of the disks. The fluid drags on the disk due to viscosity and surface adhesion, and, as the gas slows and adds rotational kinetic energy to the disks, it spirals to the center exhaust port and exits at lower velocity and pressure. According to the various embodiments of the present invention, this embodiment is simplistic and provides superior efficiency over bladed turbines.

In yet another embodiment of the present invention, a rotation-producing device, means, element, feature or combination thereof is provided that converts the velocity of burning propellant gases to rotation and can comprise magnets and a magnetohydrodynamic turbine. In such embodiments, the kinetic energy of ionized gases can be converted to torque and rotational energy of the projectile by channeling them through strong magnetic fields. The propellant can comprise salts that increase the degree of ionization of the burning propellant.

Figure 9A:
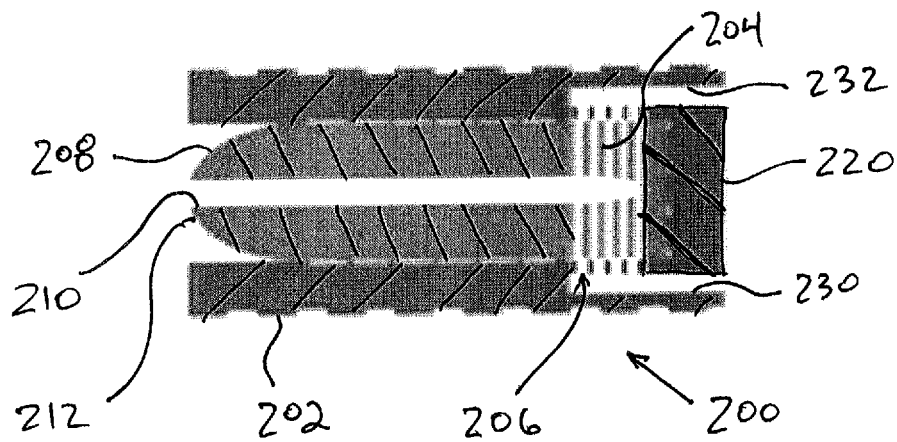
FIG. 9A is a cross-sectional side view of a projectile apparatus according to various embodiments of the present invention and comprising a sabot configured to jet combustion gases tangentially into the disks of a Tesla turbine. Reduced pressure exhaust gases are vented forwardly, ahead of the projectile and sabot.
Figure 9B:
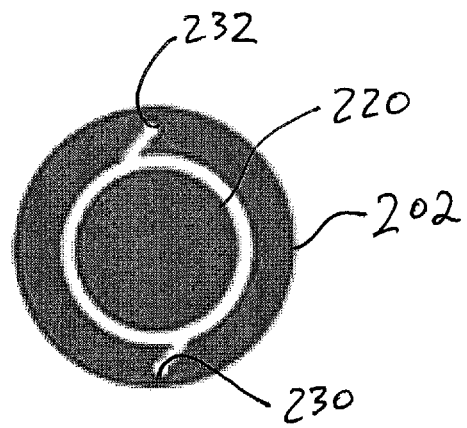
FIG. 9B is a back-end view of the projectile apparatus shown in FIG. 9A.
Figure 10:
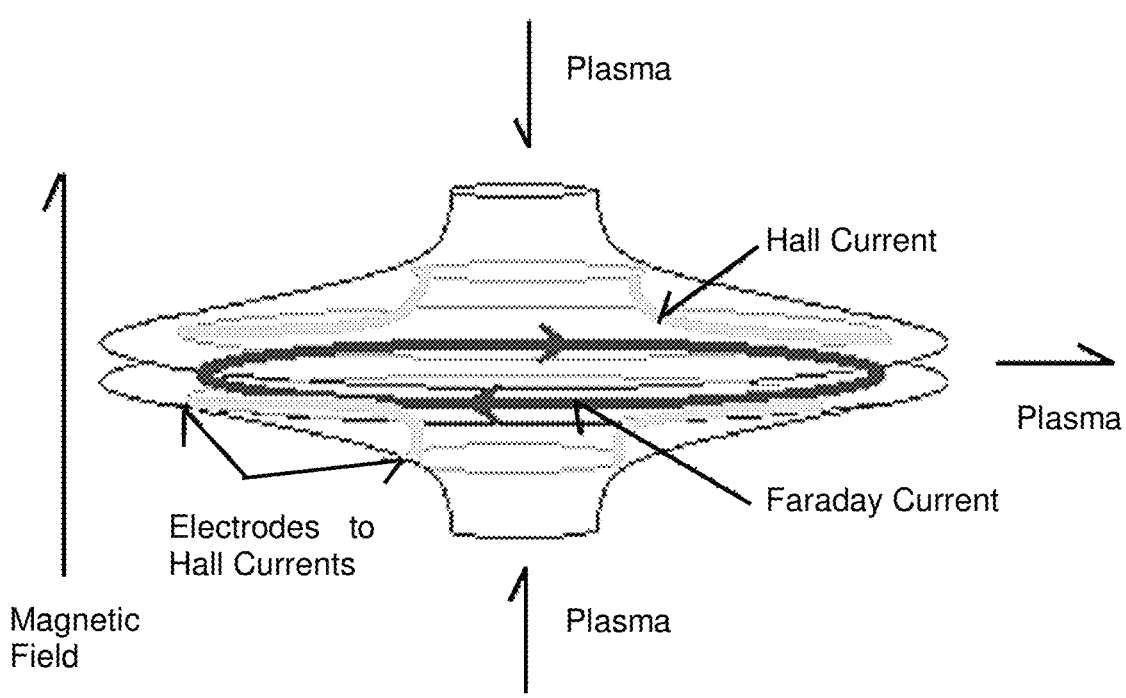
FIG. 10 is a front view of a magnetohydrodynamic turbine in partial phantom.
Figure 11:
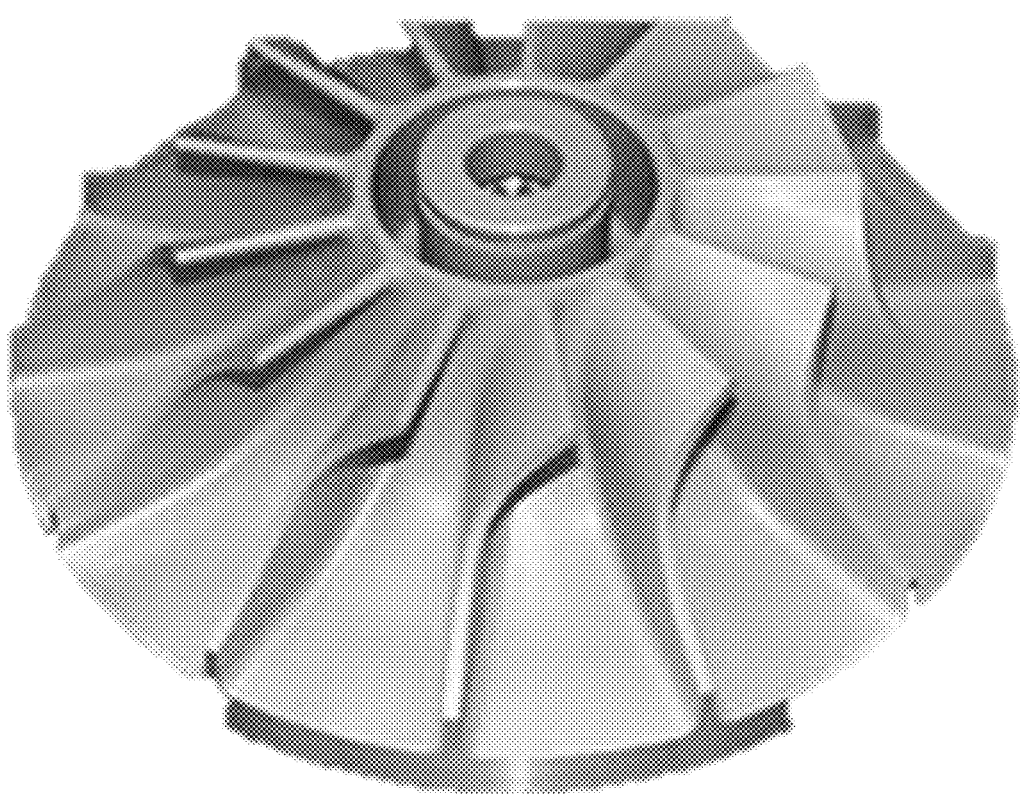
FIG. 11 is a photograph of a perspective view of a radial turbine.

In yet other embodiments of the present invention, as exemplified in FIGS. 9A and 9B, a projectile apparatus 200 is provided wherein propellant combustion gases enter a sabot 202, either directly or through a wadding 220, and are directed tangentially to disks 204 forming a Tesla turbine structure 206 that is integral to a projectile 208. FIGS. 9A and 9B are a cross-sectional view and a back-end view, respectively, of sabot 202. Sabot 202 is configured to jet combustion gases from jets 230 and 232 tangentially into the disks. Reduced pressure exhaust gases are vented forwardly, ahead of projectile 208 and sabot 202, and are vented to exit through an exhaust port 210 located at a front end 212 of projectile 208. In some cases, the exhaust gases can be directed to add complementary rotational thrust, for example, such that the projectile spins inside the sabot. Elements or features can be utilized to decrease friction between the projectile and sabot. In other embodiments, sabot 202 can comprise the Tesla turbine structure and exhaust gases can be jetted from a wadding or an intermediary element.

Friction-reducing devices, compositions, and other elements or features that can comprise bearings, ball bearings, sleeves, lubricants, lubricious materials, and surfaces coated with lubricious films, bearing surfaces, combinations thereof, and the like, can be used. Exemplary lubricants include perfluoropolyethers, such as KRYTOX (available from Dupont™ KRYTOX Performance Lubricants, Wilmington, Del.), DEMNUM (available from Daikin Industries, Ltd., Houston, Tex.), and FOMBLIN (available from Solvay, Cranbury, N.J.). Nylon, polypropylene, polyethylene terephthalate, and poly(tetrafluoroethylene) can be used and are well known for their lubricious bearing qualities. FLUOROSYL 3750 (available from Cytonix, LLC, Beltsville, Md.) and DOW CORNING® 2634 (available from Dow Corning Corporation, Midland, Mich.), are lubricious fluorosilane films for ceramics, glasses, semi-metals, metals, and oxides.

The terms projectile and bullet are used interchangeably herein and are to be regarded as the object that travels to a target upon exiting the smooth bore barrel. As described above, other components can be physically associated with the projectile, such as a sabot, a wadding, or both. The projectile can comprise a dense material, such as a metal. Exemplary metals include iron, copper, lead, tantalum, uranium, tungsten, and all alloys thereof, but can also, or instead, be composed of or combined with other metals, metal oxides, alloys, ceramics, plastics, or the like. The projectile can comprise magnetic components, ferromagnetic components, rare earth magnetic components, ceramic magnetic components, or combinations thereof. The projectile can comprise, for example, copper having a density of 8.92 grams per cubic centimeter, lead having a density of 11.34 grams per cubic centimeter, tantalum having a density of 16.654 grams per cubic centimeter, uranium having a density of 18.95 grams per cubic centimeter, or tungsten having a density of 19.25 grams per cubic centimeter. Projectiles comprising one or more of the aforementioned metals but at one or more different densities can also be used.

Projectiles of the present invention can be solid, hollow, chambered, channeled, have nozzles, have ports, or have other functional elements and features. In some embodiments, the projectile can comprise liquid or solid fuels and/or propellants, volatile liquids, oxidizable metals and materials, and air-breathing or self-oxidizing propulsion devices, means, elements and features. In some embodiments, the projectile can be integral with a turbine rotor.

In yet other embodiments of the present invention, the projectile can comprise an in-line stack or other configuration of smaller sub-projectiles, a flight-stable twisted plurality of wires, a composite comprising binder and shot, or a fully frangible material.

The projectiles of the present invention can have a length to diameter ratio of 2:1 or greater, for example, of 5:1 or greater. In some embodiments, the length to diameter ratio is 6:1 or greater, 7:1 or greater, 8:1 or greater, 9:1 or greater, or 10:1 or greater. In some embodiments, the length to diameter ratio can be from about 5:1 to about 10:1.

Nose shapes can be selected for minimal drag at velocities of from Mach 1.0 to Mach 3.0, or higher, including Von Karmen, ¾ parabolic, and x¾ profiles.

According to the various embodiments of the present invention, the projectile can have a caliber of .22, .30, .38, .44, .45, or .50, or otherwise be suitable for ordinary or conventional shotguns used most commonly for hunting and home defense. Other diameters, greater or smaller, can be used. Projectiles with diameters of one inch or more, 3 inches or more, 5 inches or more, or the like, can also be used.

According to present invention, articles, objects, and devices can be formed by molding, injection molding, powder molding, co-injection, stamping, die-cutting, water jetting, laser cutting, laser ablating, thermo-forming, embossing, extruding, machining, micromaching, additive manufacture, laser-aided additive manufacture, 3D printing, lithography, photolithography, self-assembly, 3D polymerization, a combination thereof, or the like.

According to various embodiments, additive manufacture for metal forming can be used to form one or more of the components of the projectile apparatus. Metal forming methods such as selective laser sintering, e-beam sintering, direct metal laser sintering, selective laser melting, combinations thereof, and the like, can be used. Additive manufacture to form glass, a ceramic, a mineral, or the like can be used. Additive manufacture to form components of polymers, oligomers, waxes, lubricants, plastics, combinations thereof, and the like, can be used. Combinations of these various forming techniques can be used.

Materials that can be formed by additive manufacture according to the present invention, can comprise a material having a density of from about 8 grams per cubic centimeter to about 19 grams per cubic centimeter. The material can include iron, stainless steel, aluminum, copper, lead, zinc, tantalum, uranium, tungsten, a superalloy, a magnetic material, a rare earth magnetic material, a ceramic magnetic material, a semi-metal, a semi-conductor, a combination thereof, and the like. In some embodiments, materials can be formed using additive manufacture, which comprise an alkali metal, an alkali earth metal, lithium, sodium, potassium, beryllium, magnesium, a compound of one or more of these materials, a combination thereof, and the like.

According to various embodiments, combustible materials can be formed using additive manufacture, to achieve any desired shape. Combustible materials that can be used include oxidizable metals, solid fuels, propellants, oxidizers, combinations thereof, and the like. While forming such combustible materials the additive manufacture can be carried out in a specific atmosphere, such as an inert gas atmosphere, a moisture-free gas atmosphere, a reactive gas or vapor atmosphere, a solvent vapor atmosphere, a combination thereof, or the like. The additive manufacture process can be carried out in a vacuum or at a low atmospheric pressure, such as less than 0.9 atmosphere.

According to various embodiments, the additive manufacture can include the discrete, targeted application of agents to cause localized curing in a deposited starting or layering material. For example, moisture sensitive compounds, such as oximes, silanes, and isocyanates can be cured by nanoscale or microscale application of water droplets or moisture. Catalysts or accelerants can be applied on a microscale or nanoscale. The method can include a subsequent heating step, exposure to electromagnetic energy, atmospheric treating step, moisturizing step, or the like.

According to the present invention, objects formed by additive manufacture can be any of the projectiles, turbine elements, sabots, wadding, intermediary parts, fuels, or other components described herein. Of these components, elements and features that can be formed by additive manufacture can comprise any of the turbine elements described herein. Additive manufacture can be used to form a radial turbine, an impulse turbine element, a reactive turbine element, a centripetal turbine element, a Tesla turbine element, a magnetohydrodynamic turbine element, a circuit element, a sensor element, a combination of these elements and features, and the like. The components, elements and features formed by additive manufacture can include one or more of the nozzles, ducts, channels, chambers, seals, rifling, blades, plates, fins, rotors, stators, filters, races, bearings, sleeves, bushings, combinations thereof and the like, described herein.

According to various embodiments, one or more components, elements and features can be formed by additive manufacture onto, or as part of, another component, element or feature that has been made by conventional, non-AM means. Components formed by additive manufacture can be further treated by conventional processes, such as plasma or chemical vapor deposition, heating, pressurizing, and the like.

In accordance with various embodiments, additive manufacture can be used to prepare a propellant charge. The method can comprise admixing smokeless powder granules and a nonvolatile binder, and forming the admixture into a structure by additive manufacture. The granules can be consolidated to produce a strong propellant charge wherein the smokeless powder granules retain their individual identity. The nonvolatile binders can be natural or synthetic resins, polymers, and prepolymers having a boiling point above about 200° C. These binders can be in a solid or liquid state at ambient temperature and can be compatible with nitrocellulose. The nonvolatile binders can burn completely during combustion of the propellant charge in which they are employed. The granules and binders can include those described, for example, in U.S. Pat. No. 3,655,836, which is incorporated herein in its entirety by reference. The binder can be in either a solid or liquid state. In general, from about 1% to about 5% by weight of nonvolatile binder can be admixed with the smokeless powder granules, based on the weight of the admixture. Mixing times can vary from about one minute to about one-hour. Longer times can be used for admixtures containing higher percentages of nonvolatile binder. Solid nonvolatile binders can be employed in the form of small particles. Solid nonvolatile binders can be employed by first heating the binder until it flows, and then admixing the flowable binder with pre-heated smokeless powder. The mixture can then be printed by using an additive manufacture process. Following the mixing of the smokeless powder granules and the nonvolatile binder, the resulting admixture can be formed by additive manufacture into any desired shape. The platform or starting substrate on which the propellant charge can be built can be preconditioned to a temperature of from about 20° C. to about 100° C. Higher preconditioning temperatures can be employed when the nonvolatile binder is softened at elevated temperatures. Although mold temperatures above 100° C. can be avoided, polymeric binders that flow at temperatures considerably above 100° C. can be employed if the residence time at the elevated temperature does not exceed the time-temperature stability limit for nitrocellulose.

The admixture, after being formed into a propellant charge by additive manufacture, can be compressed at pressures ranging from about 400 p.s.i. to about 25,000 p.s.i. and at dwell times of from about one second to about 60 seconds. The additive manufacture process can ensure that the smokeless powder granules in the consolidated propellant charge retain their individual identity such that, on firing of the propellant charge, the charge burns as if it were individual granules of smokeless powder. The result is ballistics that are both reproducible and predictable.

The nonvolatile binders that can be employed can be reactive or unreactive plasticizers for nitrocellulose, or reactive or unreactive non-plasticizers for nitrocellulose. Mixtures of two or more of the above classes of nonvolatile binders can be employed. Both reactive plasticizers and reactive non-plasticizers for nitrocellulose can polymerize during the additive manufacture process. Examples of suitable nonvolatile binders that are unreactive plasticizers for nitrocellulose and that can be employed include nitroglycerin, butane triol trinitrate, diethylene glycol dinitrate, methylene dinitramine, n-ethylethylnitramine, nitrate esters of pentaerythritol, and the like. These unreactive plasticizers are highly energetic and can be admixed with one or more miscible, unreactive, relatively low energy plasticizers in order to adjust burning rate and/or mechanical properties. Examples of suitable low-energy plasticizers include triacetin, dibutyl phthalate, dimethyl sebacate, tricresyl phosphate, dibutyl succinate, dibutyl adipate, camphor, ethyl centralite, and the like. The unreactive low-energy plasticizers can be employed separately omitting the unreactive energetic plasticizer if desired. Mixtures of two or more unreactive low-energy plasticizers can be employed. Examples of suitable nonvolatile binders that are reactive plasticizers for nitrocellulose include the acrylates and methacrylates of mononitrate, pentaerythritol dinitrate, pentaerythritol trinitrate, and glycerol triacrylate. The acrylates of the above pentaerythritol nitrates can be more reactive than methacrylates, resulting in a fast curing rate. Pentaerythritol mononitrate triacrylate and glycerol triacrylate are useful reactive plasticizers. The reactive plasticizers can polymerize during the additive manufacture process. Depending on the polymerization catalyst, catalyst concentration, platform temperature, and residence time used, some post curing of the propellant charge may be desired. The propellant charge, following the additive manufacture operation, is dimensionally stable and can be removed from the platform for post cure immediately following the forming operation.

Examples of suitable nonvolatile binders that are unreacted nonplasticizers for nitrocellulose and that can be employed, include energetic thermoplastics, such as polynitrostyrenes, polyvinyl nitrate, polymers derived from the acrylate and methacrylate of pentaerythritol trinitrate, and the like. Mixtures of two or more of these energetic thermoplastics can be employed, if desired. Examples of suitable non-volatile binders that are reactive non-plasticizers for nitrocellulose are 3-stage thermosetting resins that polymerize by a condensation polymerization reaction, such as phenol-formaldehyde resins, phenol furfural resins, urea formaldehyde resins, melamine formaldehyde resins, and the like. Mixtures of two or more 3-stage thermosetting resins can be employed, if desired. Examples of still other nonvolatile binders that are reactive non-plasticizers and that cross-link with nitrocellulose contained in the smokeless powder during the forming operation include isocyanates having a functionality of two or more. Representative of such isocyanates are: tolylene diisocyanate; the diisocyanate derived from the reaction of long chain diols and diisocyanates such as tolylene diisocyanate; and isocyanate mixtures comprised of polymethylene polyphenyl isocyanates having as many as eight isocyanates groups per molecule, available commercially under the trade name PAPI from The Dow Chemical Company, Midland, Mich.

According to various embodiments, superalloys can be used as building materials for a method of additive manufacture for making one or more components of the projectile apparatus. By fine-tuning their composition, superalloys can increase mechanical strength and improve resistance to corrosion and high-temperature shape changes. Adding nanoparticles can make these materials even stronger. Inconel 625 is a superalloy that is 55%-70% nickel with added chromium, molybdenum, iron, niobium-tantalum, plus trace amounts of numerous other metals. Inconel 625 is used in industrial marine applications because of its high corrosion fatigue strength, tensile strength, and resistance to chloride-ion stress-corrosion cracking.

A*STAR's Singapore Institute of Manufacturing Technology and Institute of Materials Research and Engineering have reinforced Inconel 625 using titanium diboride nanoparticles. Structures, according to the present invention, can be made from the improved superalloy by laser-aided additive manufacture. Additive manufacture can be used to create full-scale components by building them up one layer at a time. 3-D printing is one well-known example of additive manufacture, but for metals, high-power lasers can be used in a technique called laser-aided additive manufacture. Additive manufacture can be used for 3-D printing, surface modification, and repair. In various embodiments, a laser beam can be applied as a heat source, and the additive materials can be melted and deposited onto the surface of a platform or substrate, layer by layer. Adding nanoparticles to the metal base material is an effective way to tailor the material with significantly improved physical, thermal, and mechanical properties, as well as excellent performance in terms of wear and corrosion resistance. Inconel 625 alloy powder and a titanium diboride powder can be mixed and ground together. Particle sizes of from 10 nm to 200 nm, or from 40 nm to 100 nm, or of approximately 58 nanometers, can be used. An additive manufacture system can be used that comprises a powder nozzle on a six-axis robot and the output from a high-power fiber laser. In this way, one-millimeter thick layers of material can be created, for example, on a carbon steel substrate. The layers can be built up into a rectangular block, into the shape of a projectile, sabot, wadding, wing, vane, fin, or other projectile apparatus component, or into any other desired shape. The titanium diboride nanoparticles mainly aggregate at boundaries between crystalline grains of the Inconel 625. Thus, the titanium diboride can act to reinforce the grain boundary. Mechanical testing of such a material demonstrates a significantly increased material strength, relatively high microhardness, and good abrasive resistance.

Exemplary apparatus and methods that can used in laser-aided additive manufacture methods using metals, and in accordance with the present invention, include those described in the APA citation: *Nanoparticles improve the strength of metallic alloys*, provided by Agency for Science, Technology and Research (A*STAR), Singapore (Jun. 28, 2017), which can be retrieved from https://phys.org/news/2017-06-nanoparticles-strength-metallic-alloys.html, and which is incorporated herein in its entirety by reference.

HRL Laboratories has recently developed a technique for successfully 3D printing high-strength aluminum alloys, including types A17075 and A16061, that enables additive manufacture of engineering relevant alloys. These alloys can be desirable for the projectile apparatus parts according to the present invention. The method can be applied to additional alloy families such as high-strength steels and nickel-based superalloys. More details can be found in the paper *3D printing of high-strength aluminum alloys*, which was published in the Sep. 21, 2017, issue of Nature and is incorporated herein in its entirety by reference. See also nature.com/articles/doi:10.1038/nature23894.

Additive manufacture of metals can begin with alloy powders that are applied in thin layers and heated with a laser or other direct heat source to melt and solidify the layers. Normally, if high-strength unweldable aluminum alloys such as A17075 or AL6061 are used, the resulting parts suffer severe hot cracking, a condition that renders a metal part able to be pulled apart like a flaky biscuit. By using a nanoparticle functionalization technique, the problem of severe hot cracking can be solved by decorating high-strength unweldable alloy powders with specially selected nanoparticles. The nanoparticle-functionalized powder is fed into a 3D printer, which layers the powder. A laser can then be used to fuse each new layer to existing underlayers and construct a three-dimensional object. During melting and solidification, the nanoparticles act as nucleation sites for the desired alloy microstructure, preventing hot cracking and allowing for retention of full alloy strength in the manufactured part.

Because melting and solidification in additive manufacture is analogous to welding, nanoparticle functionalization can also be used to make unweldable alloys weldable. This technique is also scalable and employs low cost materials. Conventional alloy powders and nanoparticles produce printer feedstock with nanoparticles distributed uniformly on the surface of the powder grains. To find suitable nanoparticles, for example, zirconium-based nanoparticles for use with aluminum alloys, informatics can be used. Informatics software can be used to carry out a selective approach to the nucleation theory and to find the materials with the exact properties needed. Big data analysis can be used to narrow the field of available materials from hundreds of thousands to a select few.

According to various embodiments, nanoparticles can be added to metallic alloy materials, for example, super alloys, to improve the strength of the metallic alloys and structures resulting from additive manufacture using such alloys. Compositions can be fine-tuned with specific nanoparticles to increase mechanical strength and improve resistance to corrosion and high-temperature shape changes. By using additive manufacture, often referred to as 3-D printing, structures of practically any shape can be made from plastic materials, metal powder materials, and the like. New lightweight metals such as formable aluminum sheet metal can be made by additive manufacture to result in structures having 1.5 times higher strength compared with the structure made from conventional manufacturing techniques such as molding and rolling techniques. This is believed to be due to the precise alignment of metal molecules and the continuous laser welding of each layer during additive manufacture that results in a monolithic structure rather than a stack of individual layers forming a sheet. High strength magnesium sheet metal can be made that has excellent formability comparable to that of aluminum sheet metal currently used in body panels. Moreover, machine vision technology can be used to autonomously identify and sort metal 3-D printing powder types with accuracies of more than 95 percent. Such sorting can be used to add nanoparticles to metals, for example, during the melting process, to allow for better control during melting stages of an additive manufacture process.

The present invention includes the following numbered aspects, embodiments, and features, in any order and/or in any combination:

1. A method of making a projectile apparatus, comprising: making one or more components of a projectile apparatus by additive manufacture, the projectile apparatus comprising a propellant and a projectile, the projectile apparatus and elements thereof being configured to spin when fired from a smooth bore barrel, the propellant comprising a combustible material that produces exhaust gases when burned, the projectile apparatus being configured to direct exhaust gases from the propellant away from the projectile as the propellant is burned, and the projectile comprising one or more elements or features for converting gas pressure or velocity from the propellant, as the propellant is burned, to a high rate of projectile spin within a smooth bore barrel, wherein the high rate of projectile spin is greater than 30,000 rotations per minute upon exiting the barrel.

2. The method of any preceding or following embodiment/feature/aspect, comprising making the one or more elements or features by additive manufacture, wherein the one or more elements or features comprise a turbine element, and the turbine element is one of an impulse turbine element, a reactive turbine element, a centripetal turbine element, a Tesla turbine element, a magnetohydrodynamic turbine element, a radial turbine, or a combination thereof.

3. The method of any preceding or following embodiment/feature/aspect, wherein the one or more elements or features are configured to regulate, control, and direct gases produced by the propellant as the propellant is burned, into the turbine element.

4. The method of any preceding or following embodiment/feature/aspect, wherein the one or more elements or features further comprise vanes, blades, fins, plates, channels, ducts, chambers, seals, vents, a rotor, magnets, rifling, races, bearings, or a combination thereof.

5. The method of any preceding or following embodiment/feature/aspect, wherein the one or more components of the projectile apparatus are made by a laser-aided additive manufacture method from a superalloy material having nanoparticles incorporated therein.

6. The method of any preceding or following embodiment/feature/aspect, wherein the superalloy material having nanoparticles incorporated therein comprises: a nickel-based superalloy having titanium diboride nanoparticles incorporated therein; or an aluminum-based superalloy having zirconium-based nanoparticles incorporated therein.

7. The method of any preceding or following embodiment/feature/aspect, comprising making the projectile by additive manufacture, wherein the projectile comprises at least one of a combustible material, a combustible material processed under an inert atmosphere, a reactive material, a metal, a glass or ceramic, a semi-metal, a semiconductor, a super alloy, a circuit, a sensor, or a combination thereof.

8. The method of any preceding or following embodiment/feature/aspect, wherein the projectile comprises one or more channels or ducts that begin at, or near, the rear of the projectile and extend to, or near, the front of the projectile, the one or more channels or ducts are configured to convey exhaust gas from the propellant as the propellant is burned, to one or more rotational nozzles or jets configured to direct exhaust to a smooth bore barrel ahead of the projectile.

9. A method of making a projectile apparatus, comprising:
making one or more components of a projectile apparatus by additive manufacture, the projectile apparatus comprising a propellant, a projectile, and a sabot, the projectile apparatus being configured to spin when fired from a smooth bore barrel, the propellant comprising a combustible material that produces exhaust gases when burned, the projectile apparatus being configured to direct exhaust gases from the propellant away from the propellant as the propellant is burned, and one or both of the projectile and the sabot comprising one or more elements or features for converting gas pressure or velocity from the propellant, as the propellant is burned, to a high rate of projectile spin within a smooth bore barrel, wherein the high rate of projectile spin is greater than 30,000 rotations per minute upon exiting the barrel.

10. The method of any preceding or following embodiment/feature/aspect, comprising making the sabot by additive manufacture, wherein the sabot comprises a turbine element, and the turbine element is one of an impulse turbine element, a reactive turbine element, a centripetal turbine element, a Tesla turbine element, a magnetohydrodynamic turbine element, radial turbine, or a combination thereof.

11. The method of any preceding or following embodiment/feature/aspect, wherein the sabot comprises one or more elements or features configured to regulate, control, and direct gases produced by the propellant as the propellant is burned, into the turbine element.

12. The method of any preceding or following embodiment/feature/aspect, wherein the one or more elements or features comprise vanes, blades, fins, plates, channels, ducts, chambers, seals, vents, nozzles, a stator, a rotor, magnets, rifling, races, bearings, or a combination thereof.

13. The method of any preceding or following embodiment/feature/aspect, wherein the one or more components of the projectile apparatus are made by a laser-aided additive manufacture method from a superalloy material having nanoparticles incorporated therein.

14. The method of any preceding or following embodiment/feature/aspect, wherein the superalloy material having nanoparticles incorporated therein comprises: a nickel-based superalloy having titanium diboride nanoparticles incorporated therein; or an aluminum-based superalloy having zirconium-based nanoparticles incorporated therein.

15. The method of any preceding or following embodiment/feature/aspect, wherein the projectile apparatus comprises one or more channels or ducts that begin at, or near, the rear of the projectile apparatus and extend to, or near, the front of the projectile apparatus, the one or more channels or ducts are configured to convey exhaust gas from the propellant as the propellant is burned, to one or more rotational nozzles or jets configured to direct exhaust to a smooth bore barrel ahead of the projectile apparatus.

16. The method of any preceding or following embodiment/feature/aspect, further comprising:
making an intermediary component by additive manufacture, wherein the intermediary component interlocks with the projectile and/or sabot and comprises one or more elements or features configured to regulate, control, and direct gases produced by the propellant as the propellant is burned, into the turbine element; and
incorporating the intermediary component into the projectile apparatus.

17. The method of any preceding or following embodiment/feature/aspect, wherein the projectile apparatus further comprises an element or feature for reducing drag, adding thrust, or both, wherein the method comprises making the element or feature by additive manufacture and the element or feature comprises an air breathing or self-oxidizing element or feature.

18. A method of making a projectile apparatus, comprising:
making one or more components of the projectile apparatus by additive manufacture, the projectile apparatus comprising a propellant, a projectile, and a wadding, the projectile apparatus being configured to spin when fired from a smooth bore barrel, the propellant comprising a combustible material that produces exhaust gases when burned, the projectile apparatus being configured to direct exhaust gases from the propellant away from the propellant as the propellant is burned, and one or both of the projectile and the wadding comprising one or more elements or features for converting gas pressure or velocity from the propellant, as the propellant is burned, to a high rate of projectile spin within a smooth bore barrel, wherein the high rate of projectile spin is greater than 30,000 rotations per minute upon exiting the barrel.

15. The method of any preceding or following embodiment/feature/aspect, comprising making the wadding by additive manufacture, wherein the wadding comprises a turbine element and the turbine element is one of an impulse turbine element, a reactive turbine element, a centripetal turbine element, a Tesla turbine element, a magnetohydrodynamic turbine element, a radial turbine, or a combination thereof.

16. The method of any preceding or following embodiment/feature/aspect, comprising making the wadding by additive manufacture, wherein the wadding comprises one or more elements or features configured to regulate, control, and direct gases produced by the propellant as the propellant is burned, into the turbine element.

17. The method of any preceding or following embodiment/feature/aspect, wherein the one or more elements or features comprise vanes, blades, fins, plates, channels, ducts, chambers, seals, vents, nozzles, a stator, a rotor, magnets, rifling, races, bearings, or a combination thereof.

18. The method of any preceding or following embodiment/feature/aspect, wherein the one or more components of the projectile apparatus are made by a laser-aided additive manufacture method from a superalloy material having nanoparticles incorporated therein.

19. The method of any preceding or following embodiment/feature/aspect, wherein the superalloy material having nanoparticles incorporated therein comprises: a nickel-based superalloy having titanium diboride nanoparticles incorporated therein; or an aluminum-based superalloy having zirconium-based nanoparticles incorporated therein.

20. The method of any preceding or following embodiment/feature/aspect, comprising making the wadding by additive manufacture, wherein the wadding comprises one or more channels or ducts that begin at, or near, the rear of the projectile and extend to, or near, the front of the projectile, the one or more channels or ducts are configured to convey exhaust gas from the propellant as the propellant is burned, to one or more rotational nozzles or jets configured to direct exhaust to a smooth bore barrel ahead of the projectile.

21. The method of any preceding or following embodiment/feature/aspect, further comprising:
  making an intermediary component by additive manufacture, wherein the intermediary component comprises one or more elements or features configured to regulate, control, and direct gases produced by the propellant as the propellant is burned, into the turbine element; and
  incorporating the intermediary component into the projectile apparatus.

22. The method of any preceding or following embodiment/feature/aspect, wherein the projectile apparatus further comprises an element or feature for reducing drag, adding thrust, or both, wherein the method further comprises making the element or feature by additive manufacture and the element or feature comprises an air breathing or self-oxidizing element or feature.

23. The method of any preceding or following embodiment/feature/aspect, wherein the projectile apparatus further comprises a sabot, an intermediary component, or both, wherein the sabot, intermediary component, or both comprise one or more elements or features configured to mechanically interlock two or more of the projectile, sabot and wadding, and/or to regulate, control, and direct gases produced by the propellant as the propellant is burned, into a turbine element, and the method further comprises making the one or more elements or features configured to mechanically interlock, by additive manufacture.

The present invention can include any combination of these various embodiments, features, and aspects above as set forth in sentences and/or paragraphs. Any combination of disclosed features herein is considered part of the present invention and no limitation is intended with respect to combinable features.

The entire contents of all references cited in this disclosure are incorporated herein in their entireties, by reference. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether such ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only, with a true scope and spirit of the invention being indicated by the following claims and equivalents thereof.

What is claimed is:

1. A method of making a projectile apparatus, the projectile apparatus comprising a propellant and a projectile, the projectile apparatus and elements thereof being configured to spin when fired from a smooth bore barrel, the propellant comprising a combustible material that produces exhaust gases when burned, the projectile apparatus being configured to direct exhaust gases from the propellant away from the projectile as the propellant is burned, and the projectile comprising one or more elements or features for converting gas pressure or velocity from the propellant, as the propellant is burned, to a high rate of projectile spin within a smooth bore barrel, wherein the high rate of projectile spin is greater than 30,000 rotations per minute upon exiting the barrel, wherein the method comprises making the one or more elements or features by additive manufacture, wherein the one or more elements or features comprise a turbine element, and the turbine element is one of an impulse turbine element, a reactive turbine element, a centripetal turbine element, a Tesla turbine element, a magnetohydrodynamic turbine element, a radial turbine, or a combination thereof, and the one or more elements or features are configured to regulate, control, and direct gases produced by the propellant, as the propellant is burned, into the turbine element, and wherein the projectile comprises one or more channels or ducts that begin at, or near, the rear of the projectile and extend to, or near, the front of the projectile, the one or more channels or ducts are configured to convey exhaust gas from the propellant as the propellant is burned, to one or more rotational nozzles or jets configured to direct exhaust to a smooth bore barrel ahead of the projectile.

2. The method of claim 1, wherein the one or more elements or features further comprise vanes, blades, fins, plates, channels, ducts, chambers, seals, vents, a rotor, magnets, rifling, races, bearings, or a combination thereof.

3. The method of claim 1, wherein the projectile of the projectile apparatus is made by a laser-aided additive manufacture method from a superalloy material having nanoparticles incorporated therein.

4. The method of claim 3, wherein the superalloy material having nanoparticles incorporated therein comprises: a nickel-based superalloy having titanium diboride nanoparticles incorporated therein; or an aluminum-based superalloy having zirconium-based nanoparticles incorporated therein.

5. The method of claim 1, comprising making the projectile by additive manufacture, wherein the projectile comprises at least one of a combustible material, a combustible material processed under an inert atmosphere, a reactive material, a metal, a glass or ceramic, a semi-metal, a semiconductor, a super alloy, a circuit, a sensor, or a combination thereof.

6. The method of claim 1, wherein the one or more elements or features comprise the impulse turbine element, the impulse turbine element having blades, and
   wherein the one or more elements or features further comprise a stator defining a plurality of nozzles configured to direct the exhaust gases into the blades of the impulse turbine element.

7. The method of claim 1, wherein the projectile comprises a device or means for reducing drag, adding thrust, or both, the device or means comprising an air breathing or self-oxidizing element or feature.

8. The method of claim 1, wherein the one or more elements or features made by additive manufacture comprises iron, carbon-steel, an Inconel alloy, titanium diboride, stainless steel, aluminum, an aluminum alloy, zirconium, a zirconium alloy, copper, lead, zinc, tantalum, uranium, or tungsten.

9. The method of claim 1, wherein the one or more elements or features made by additive manufacture comprises aluminum.

10. The method of claim 1, wherein the projectile comprises a metal oxide, a metal alloy, a ceramic, or a plastic.

11. The method of claim 1, wherein the projectile comprises an alkali metal, an alkali earth metal, lithium, sodium, potassium, beryllium, magnesium, or a combination thereof.

12. The method of claim 1, wherein the projectile comprises an alkali metal, an alkali earth metal, or a combination thereof.

13. The method of claim 1, wherein the projectile comprises lithium, sodium, potassium, beryllium, magnesium, or a combination thereof.

14. The method of claim 1, wherein the projectile comprises aluminum.

15. The method of claim 1, wherein the projectile comprises magnesium.

16. The method of claim 1, wherein the projectile comprises lithium.

17. The method of claim 1, wherein the projectile comprises sodium.

18. The method of claim 1, wherein the propellant comprises magnesium, mercury fulminate, tannerite, or black powder.

19. The method of claim 1, wherein the propellant comprises magnesium.

\* \* \* \* \*